(12) United States Patent
Chang et al.

(10) Patent No.: US 6,984,705 B2
(45) Date of Patent: *Jan. 10, 2006

(54) COMPOSITION AND METHOD FOR RECOVERING HYDROCARBON FLUIDS FROM A SUBTERRANEAN RESERVOIR

(75) Inventors: Kin-Tai Chang, Sugar Land, TX (US); Harry Frampton, Wooldale (GB); James C. Morgan, Yateley (GB)

(73) Assignee: Ondeo Nalco Energy Services, L.P., Sugar Land, TX (US)

( * ) Notice: Subject to any disclaimer, the term of this patent is extended or adjusted under 35 U.S.C. 154(b) by 616 days.

This patent is subject to a terminal disclaimer.

(21) Appl. No.: 10/233,950

(22) Filed: Sep. 3, 2002

(65) Prior Publication Data

US 2003/0116317 A1    Jun. 26, 2003

Related U.S. Application Data

(63) Continuation of application No. 09/593,197, filed on Jun. 14, 2000, now Pat. No. 6,454,003.

(51) Int. Cl.
    *C08F 26/06*    (2006.01)
(52) U.S. Cl. .................. 526/260; 526/286; 526/304; 526/307; 526/310; 526/312; 166/295; 523/130
(58) Field of Classification Search ............... 166/270, 166/275, 295, 272.4–272.6, 294, 403; 523/130, 523/131; 507/903, 224, 225, 261, 266; 526/260, 526/286, 304, 307, 310, 312
See application file for complete search history.

(56) References Cited

U.S. PATENT DOCUMENTS

| | | |
|---|---|---|
| 4,172,066 A | 10/1979 | Zweigle et al. |
| 4,956,400 A | 9/1990 | Kozakiewicz et al. |
| 4,968,435 A | 11/1990 | Neff et al. |
| 5,106,929 A | 4/1992 | Ahmed et al. |
| 5,152,903 A | 10/1992 | Neff et al. |
| 5,171,808 A | 12/1992 | Ryles et al. |
| 5,465,792 A | 11/1995 | Dawson et al. |
| 5,735,349 A | 4/1998 | Dawson et al. |

FOREIGN PATENT DOCUMENTS

WO    WO-9108269 A1 *   6/1991

* cited by examiner

*Primary Examiner*—Zakiya Walker
(74) *Attorney, Agent, or Firm*—Michael B. Martin; Thomas M. Breininger

(57) ABSTRACT

A composition comprising expandable cross linked polymeric microparticles having an unexpanded volume average particle size diameter of from about 0.05 to about 10 microns and a cross linking agent content of from about 9,000 to about 200,000 ppm of labile cross linkers and from 0 to about 300 ppm of non-labile cross linkers. The composition is used for modifying the permeability of subterranean formations and increasing the mobilization and/or recovery rate of hydrocarbon fluids present in the formations.

19 Claims, No Drawings

COMPOSITION AND METHOD FOR RECOVERING HYDROCARBON FLUIDS FROM A SUBTERRANEAN RESERVOIR

CROSS REFERENCE TO RELATED APPLICATIONS

This is a continuation of Ser. No. 09/593,197, filed Jun. 14, 2000, now U.S. Pat. No. 6,454,003.

TECHNICAL FIELD

This invention provides compositions and methods for the recovery of hydrocarbon fluids from a subterranean reservoir. More particularly, this invention concerns expandable cross-linked polymeric microparticle compositions that modify the permeability of subterranean formations and increase the mobilization and/or recovery rate of hydrocarbon fluids present in the formations.

SUMMARY OF THE INVENTION

In the first stage of hydrocarbon recovery the sources of energy present in the reservoir are allowed to move the oil, gas, condensate etc. to the producing wells(s) where they can flow or be pumped to the surface handling facility. A relatively small proportion of the hydrocarbon in place can usually be recovered by this means. The most widely used solution to the problem of maintaining the energy in the reservoir and ensuring that hydrocarbon is driven to the producing well(s) is to inject fluids down adjacent wells. This is commonly known as secondary recovery.

The fluids normally used are water (such as aquifer water, river water, sea water, or produced water), or gas (such as produced gas, carbon dioxide, flue gas and various others). If the fluid encourages movement of normally immobile residual oil or other hydrocarbon, the process is commonly termed tertiary recovery.

A very prevalent problem with secondary and tertiary recovery projects relates to the heterogeneity of the reservoir rock strata. The mobility of the injected fluid is commonly different from the hydrocarbon and when it is more mobile various mobility control processes have been used to make the sweep of the reservoir more uniform and the consequent hydrocarbon recovery more efficient. Such processes have limited value when high permeability zones, commonly called thief zones or streaks, exist within the reservoir rock. The injected fluid has a low resistance route from the injection to the production well. In such cases the injected fluid does not effectively sweep the hydrocarbon from adjacent, lower permeability zones. When the produced fluid is re-used this can lead to fluid cycling through the thief zone to little benefit and at great cost in terms of fuel and maintenance of the pumping system.

Numerous physical and chemical methods have been used to divert injected fluids out of thief zones in or near production and injection wells. When the treatment is applied to a producing well it is usually termed a water (or gas etc.) shut-off treatment. When it is applied to an injection well it is termed a profile control or conformance control treatment.

In cases where the thief zone(s) are isolated from the lower permeability adjacent zones and when the completion in the well forms a good seal with the barrier (such as a shale layer or "stringer") causing the isolation, mechanical seals or "plugs" can be set in the well to block the entrance of the injected fluid. If the fluid enters or leaves the formation from the bottom of the well, cement can also be used to fill up the well bore to above the zone of ingress.

When the completion of the well allows the injected fluid to enter both the thief and the adjacent zones, such as when a casing is cemented against the producing zone and the cement job is poorly accomplished, a cement squeeze is often a suitable means of isolating the watered out zone.

Certain cases are not amenable to such methods by virtue of the facts that communication exists between layers of the reservoir rock outside the reach of cement. Typical examples of this are when fractures or rubble zones or washed out caverns exist behind the casing. In such instances chemical gels, capable of moving through pores in reservoir rock have been applied to seal off the swept out zones.

When such methods fail the only alternatives remaining are to produce the well with poor recovery rate, sidetrack the well away from the prematurely swept zone, or the abandon the well. Occasionally the producing well is converted to a fluid injector to increase the field injection rate above the net hydrocarbon extraction rate and increase the pressure in the reservoir. This can lead to improved overall recovery but it is worthy of note that the injected fluid will mostly enter the thief zone at the new injector and is likely to cause similar problems in nearby wells. All of these are expensive options.

Near wellbore conformance control methods always fail when the thief zone is in widespread contact with the adjacent, hydrocarbon containing, lower permeability zones. The reason for this is that the injected fluids can bypass the treatment and re-enter the thief zone having only contacted a very small proportion, or even none of the remaining hydrocarbon. It is commonly known amongst those skilled in the art, that such near wellbore treatments do not succeed in significantly improving recovery in reservoirs having crossflow of the injected fluids between zones.

A few processes have been developed with the aim of reducing the permeability in a substantial proportion of the thief zone and, or at a significant distance from the injection and production wells. One example of this is the Deep Diverting Gel process patented by Morgan et al (1). This has been used in the field and suffered from sensitivity to unavoidable variations in quality of the reagents which resulted in poor propagation. The gelant mixture is a two component formulation and it is believed that this contributed to poor propagation of the treatment into the formation.

The use of swellable cross linked superabsorbent polymer microparticles for modifying the permeability of subterranean formations is disclosed in U.S. Pat. Nos. 5,465,792 and 5,735,349. However, swelling of the superabsorbent microparticles described therein is induced by changes of the carrier fluid from hydrocarbon to aqueous or from water of high salinity to water of low salinity.

SUMMARY OF THE INVENTION

We have discovered novel polymeric microparticles in which the microparticle conformation is constrained by reversible (labile) internal crosslinks. The microparticle properties, such as particle size distribution and density, of the constrained microparticle are designed to allow efficient propagation through the pore structure of hydrocarbon reservoir matrix rock, such as sandstone. On heating to reservoir temperature and/or at a predetermined pH, the reversible (labile) internal crosslinks start to break allowing the particle to expand by absorbing the injection fluid (normally water).

The ability of the particle to expand from its original size (at the point of injection) depends only on the presence of conditions that induce the breaking of the labile crosslinker. It does not depend on the nature of the carrier fluid or the salinity of the reservoir water. The particles of this invention can propagate through the porous structure of the reservoir without using a designated fluid or fluid with salinity higher than the reservoir fluid.

The expanded particle is engineered to have a particle size distribution and physical characteristics, for example, particle rheology, which allow it to impede the flow of injected fluid in the pore structure. In doing so it is capable of diverting chase fluid into less thoroughly swept zones of the reservoir.

The rheology and expanded particle size of the particle can be designed to suit the reservoir target, for example by suitable selection of the backbone monomers or comonomer ratio of the polymer, or the degree of reversible (labile) and irreversible crosslinking introduced during manufacture.

Accordingly, in its principal embodiment, this invention is directed to a composition comprising highly cross linked expandable polymeric microparticles having an unexpanded volume average particle size diameter of from about 0.05 to about 10 microns and a cross linking agent content of from about 9,000 to about 200,000 ppm of labile cross linkers and from 0 to about 300 ppm of non-labile cross linkers.

DETAILED DESCRIPTION OF THE INVENTION

Definitions of Terms

"Amphoteric polymeric microparticle" means a cross-linked polymeric microparticle containing both cationic substituents and anionic substitutents, although not necessarily in the same stoichiometric proportions. Representative amphoteric polymeric microparticles include terpolymers of nonionic monomers, anionic monomers and cationic monomers as defined herein. Preferred amphoteric polymeric microparticles have a higher than 1:1 anionic monomer/cationic monomer mole ratio.

"Ampholytic ion pair monomer: means the acid-base salt of basic, nitrogen containing monomers such as dimethylaminoethylacrylate (DMAEA), dimethylaminoethyl methacrylate (DMAEM), 2-methacryloyloxyethyldiethylamine, and the like and acidic monomers such as acrylic acid and sulfonic acids such as 2-acrylamido-2-methylpropane sulfonic acid, 2-methacryloyloxyethane sulfonic acid, vinyl sulfonic acid, styrene sulfonic acid, and the like. "Anionic monomer" means a monomer as defined herein which possesses an acidic functional group and the base addition salts thereof. Representative anionic monomers include acrylic acid, methacrylic acid, maleic acid, itaconic acid, 2-propenoic acid, 2-methyl-2-propenoic acid, 2-acrylamido-2-methyl propane sulfonic acid, sulfopropyl acrylic acid and other water-soluble forms of these or other polymerizable carboxylic or sulphonic acids, sulphomethylated acrylamide, allyl sulphonic acid, vinyl sulphonic acid, the quaternary salts of acrylic acid and methacrylic acid such as ammonium acrylate and ammonium methacrylate, and the like. Preferred anionic monomers include 2-acrylamido-2-methyl propanesulfonic acid sodium salt, vinyl sulfonic acid sodium salt and styrene sulfonic acid sodium salt. 2-Acrylamido-2-methyl propanesulfonic acid sodium salt is more preferred.

"Anionic polymeric microparticle" means a cross-linked polymeric microparticle containing a net negative charge. Representative anionic polymeric microparticles include copolymers of acrylamide and 2-acrylamido-2-methyl propane sulfonic acid, copolymers of acrylamide and sodium acrylate, terpolymers of acrylamide, 2-acrylamido-2-methyl propane sulfonic acid and sodium acrylate and homopolymers of 2-acrylamido-2-methyl propane sulfonic acid. Preferred anionic polymeric microparticles are prepared from about 95 to about 10 mole percent of nonionic monomers and from about 5 to about 90 mole percent anionic monomers. More preferred anionic polymeric microparticles are prepared from about 95 to about 10 mole percent acrylamide and from about 5 to about 90 mole percent 2-acrylamido-2-methyl propane sulfonic acid.

Betaine-containing polymeric microparticle" means a cross-linked polymeric microparticle prepared by polymerizing a betaine monomer and one or more nonionic monomers.

"Betaine monomer" means a monomer containing cationically and anionically charged functionality in equal proportions, such that the monomer is net neutral overall. Representative betaine monomers include N,N-dimethyl-N-acryloyloxyethyl-N-(3-sulfopropyl)-ammonium betaine, N,N-dimethyl-N-methacryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(2-carboxymethyl)-ammonium betaine, N,N-dimethyl-N-acryloxyethyl-N-(3-sulfopropyl)-ammonium betaine, N,N-dimethyl-N-acrylamidopropyl-N-(2-carboxymethyl)-ammonium betaine, N-3-sulfopropylvinylpyridine ammonium betaine, 2-(methylthio)ethyl methacryloyl-S-(sulfopropyl)-sulfonium betaine, 1-(3-sulfopropyl)-2-vinylpyridinium betaine, N-(4-sulfobutyl)-N-methyldiallylamine ammonium betaine (MDABS), N,N-diallyl-N-methyl-N-(2-sulfoethyl) ammonium betaine, and the like. A preferred betaine monomer is N,N-dimethyl-N-methacryloyloxyethyl-N-(3-sulfopropyl)-ammonium betaine.

"Cationic Monomer" means a monomer unit as defined herein which possesses a net positive charge. Representative cationic monomers include the quaternary or acid salts of dialkylaminoalkyl acrylates and methacrylates such as dimethylaminoethylacrylate methyl chloride quaternary salt (DMAEA.MCQ), dimethylaminoethylmethacrylate methyl chloride quaternary salt (DMAEM.MCQ), dimethylaminoethylacrylate hydrochloric acid salt, dimethylaminoethylacrylate sulfuric acid salt, dimethylaminoethyl acrylate benzyl chloride quaternary salt (DMAEA.BCQ) and dimethylaminoethylacrylate methyl sulfate quaternary salt; the quaternary or acid salts of dialkylaminoalkylacrylamides and methacrylamides such as dimethylaminopropyl acrylamide hydrochloric acid salt, dimethylaminopropyl acrylamide sulfuric acid salt, dimethylaminopropyl methacrylamide hydrochloric acid salt and dimethylaminopropyl methacrylamide sulfuric acid salt, methacrylamidopropyl trimethyl ammonium chloride and acrylamidopropyl trimethyl ammonium chloride; and N,N-diallyldialkyl ammonium halides such as diallyldimethyl ammonium chloride (DADMAC). Preferred cationic monomers include dimethylaminoethylacrylate methyl chloride quaternary salt, dimethylaminoethylmethacrylate methyl chloride quaternary salt and diallyldimethyl ammonium chloride. Diallyldimethyl ammonium chloride is more preferred.

"Cross linking monomer" means an ethylenically unsaturated monomer containing at least two sites of ethylenic unsaturation which is added to constrain the microparticle conformation of the polymeric microparticles of this invention. The level of cross linking used in these polymer microparticles is high, compared to conventional superabsorbent polymers, to maintain a rigid non-expandable microparticle configuration. Cross linking monomers according to this invention include both labile cross linking monomers and non-labile cross linking monomers.

"Emulsion", "microemulsion" and "inverse emulsion" mean a water-in-oil polymer emulsion comprising a polymeric microparticle according to this invention in the aqueous phase, a hydrocarbon oil for the oil phase and one or more water-in-oil emulsifying agents. Emulsion polymers are hydrocarbon continuous with the water-soluble polymers dispersed within the hydrocarbon matrix. The emulsion polymers are optionally "inverted" or converted into water-continuous form using shear, dilution, and, generally an inverting surfactant. See U.S. Pat. No. 3,734,873, incorporated herein by reference.

"Fluid mobility" means a ratio that defines how readily a fluid moves through a porous medium. This ratio is known as the mobility and is expressed as the ratio of the permeability of the porous medium to the viscosity for a given fluid.

1.

$$\lambda = \frac{k_x}{\eta_x}$$

for a single fluid x flowing in a porous medium.

When more than one fluid is flowing the end point relative permeabilities must be substituted for the absolute permeability used in equation 1.

2.

$$\lambda_x = \frac{k_{rx}}{\eta_x}$$

for a fluid x flowing in a porous medium in the presence of one or more other fluids.

When two or more fluids are flowing the fluid mobilities may be used to define a Mobility ratio

3.

$$M = \frac{\lambda_x}{\lambda_y} = \frac{\eta_y k_{rx}}{\eta_x k_{ry}}$$

The mobility ratio is of use in the study of fluid displacement, for example in water flooding of an oil reservoir where x is water and y is oil, because the efficiency of the displacement process can be related to it. As a general principle at a mobility ratio of 1 the fluid front moves almost in a "Plug flow" manner and the sweep of the reservoir is good. When the mobility of the water is ten times greater than the oil viscous instabilities, known as fingering, develop and the sweep of the reservoir is poor. When the mobility of the oil is ten times greater than the water the sweep of the reservoir is almost total.

"Ion-pair polymeric microparticle" means a cross-linked polymeric microparticle prepared by polymerizing an ampholytic ion pair monomer and one more anionic or nonionic monomers.

"Labile cross linking monomer" means a cross linking monomer which can be degraded by certain conditions of heat and/or pH, after it has been incorporated into the polymer structure, to reduce the degree of crosslinking in the polymeric microparticle of this invention. The aforementioned conditions are such that they can cleave bonds in the "cross linking monomer" without substantially degrading the rest of the polymer backbone. Representative labile cross linking monomers include diacrylamides and methacrylamides of diamines such as the diacrylamide of piperazine, acrylate or methacrylate esters of di, tri, tetra hydroxy compounds including ethyleneglycol diacrylate, polyethyleneglycol diacrylate, trimethylopropane trimethacrylate, ethoxylated trimethylol triacrylate, ethoxylated pentaerythritol tetracrylate, and the like; divinyl or diallyl compounds separated by an azo such as the diallylamide of 2,2'-Azobis (isbutyric acid) and the vinyl or allyl esters of di or tri functional acids. Preferred labile cross linking monomers include water soluble diacrylates such as PEG 200 diacrylate and PEG 400 diacrylate and polyfunctional vinyl derivatives of a polyalcohol such as ethoxylated (9–20) trimethylol triacrylate.

The labile cross linker is present in an amount of from 9000 to about 200,000 ppm, preferably from about 9000 to about 100,000 ppm and more preferably from about 20,000 to about 60,000 ppm based on total moles of monomer.

"Monomer" means a polymerizable allylic, vinylic or acrylic compound. The monomer may be anionic, cationic, nonionic or zwitterionic. Vinyl monomers are preferred, acrylic monomers are more preferred.

"Nonionic monomer" means a monomer as defined herein which is electrically neutral. Representative nonionic monomers include N-isopropylacrylamide, N,N-dimethylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate and N-vinyl formamide. Preferred nonionic monomers include acrylamide, N-methylacrylamide, N,N-dimethylacrylamide and methacrylamide. Acrylamide is more preferred.

"Non-labile cross linking monomer" means a cross linking monomer which is not degraded under the conditions of temperature and/or pH which would cause incorporated labile cross linking monomer to disintegrate. Non-labile cross linking monomer is added, in addition to the labile cross linking monomer, to control the expanded conformation of the polymeric microparticle. Representative non-labile cross linking monomers include methylene bisacrylamide, diallylamine, triallylamine, divinyl sulfone, diethyleneglycol diallyl ether, and the like. A preferred non-labile cross linking monomer is methylene bisacrylamide.

The non-labile cross linker is present in an amount of from 0 to about 300 ppm, preferably from about 0 to about 200 ppm and more preferably from about 0 to about 100 ppm based on total moles of monomer. In the absence of a non-labile cross linker, the polymer particle, upon complete scission of labile cross linker, is converted into a mixture of linear polymer strands. The particle dispersion is thereby changed into a polymer solution. This polymer solution, due to its viscosity, changes the mobility of the fluid in a porous medium. In the presence of a small amount of non-labile cross linker, the conversion from particles to linear molecules is incomplete. The particles become a loosely linked network but retain certain 'structure'. Such 'structured' particles can block the pore throats of porous media and create a blockage of flow.

Preferred Embodiments

In a preferred aspect, the polymeric microparticles of this invention are prepared using an inverse emulsion or microemulsion process to assure certain particle size range. The unexpanded volume average particle size diameter of the polymeric microparticle is preferably from about 0.1 to about 3 microns, more preferably from about 0.1 to about 1 microns.

Representative preparations of cross-linked polymeric microparticles using microemulsion process are described in U.S. Pat. Nos. 4,956,400, 4,968,435, 5,171,808, 5,465,792 and 5,735,439.

In an inverse emulsion or microemulsion process, an aqueous solution of monomers and cross linkers is added to a hydrocarbon liquid containing an appropriate surfactant or surfactant mixture to form an inverse monomer microemulsion consisting of small aqueous droplets dispersed in the continuous hydrocarbon liquid phase and subjecting the monomer microemulsion to free radical polymerization.

In addition to the monomers and cross linkers, the aqueous solution may also contain other conventional additives including chelating agents to remove polymerization inhibitors, pH adjusters, initiators and other conventional additives.

The hydrocarbon liquid phase comprises a hydrocarbon liquid or mixture of hydrocarbon liquids. Saturated hydrocarbons or mixtures thereof are preferred. Typically, the hydrocarbon liquid phase comprises benzene, toluene, fuel oil, kerosene, odorless mineral spirits and mixtures of any of the foregoing.

Surfactants useful in the microemulsion polymerization process described herein include sorbitan esters of fatty acids, ethoxylated sorbitan esters of fatty acids, and the like or mixtures thereof. Preferred emulsifying agents include ethoxylated sorbitol oleate and sorbitan sesquioleate. Additional details on these agents may be found in McCutcheon's *Detergents and Emulsifier*, North American Edition, 1980.

Polymerization of the emulsion may be carried out in any manner known to those skilled in the art. Initiation may be effected with a variety of thermal and redox free-radical initiators including azo compounds, such as azobisisobutyronitrile; peroxides, such as t-butyl peroxide; organic compounds, such as potassium persulfate and redox couples, such as sodium bisulfite/sodium bromate. Preparation of an aqueous product from the emulsion may be effected by inversion by adding it to water which may contain an inverting surfactant.

Alternatively, the polymeric microparticles cross linked with labile cross links are prepared by internally cross linking polymer particles which contain polymers with pendant carboxylic acid and hydroxyl groups. The cross linking is achieved through the ester formation between the carboxylic acid and hydroxyl groups. The esterification can be accomplished by azeotropic distillation (U.S. Pat. No. 4,599,379) or thin film evaporation technique (U.S. Pat. No. 5,589,525) for water removal. For example, a polymer microparticle prepared from inverse emulsion polymerization process using acrylic acid, 2-hydroxyethylacrylate, acrylamide and 2-acrylamido-2-methylpropanesulfonate sodium as monomer is converted into cross linked polymer particles by the dehydration processes described above.

The polymeric microparticles are optionally prepared in dry form by adding the emulsion to a solvent which precipitates the polymer such as isopropanol, isopropanol/acetone or methanol/acetone or other solvents or solvent mixtures that are miscible with both hydrocarbon and water and filtering off and drying the resulting solid.

An aqueous suspension of the polymeric microparticles is prepared by redispersing the dry polymer in water.

In another embodiment, this invention is directed to a method of modifying the permeability to water of a subterranean formation comprising injecting into the subterranean formation a composition comprising cross linked polymeric microparticles having a cross linking agent content of from about 0.9 to about 20 mole percent of labile cross linkers and from 0 to about 300 ppm of non-labile cross linkers wherein the microparticles have a smaller diameter than the pores of the subterranean formation and wherein the labile cross linkers break under the conditions of termperature and pH in the subterranean formation to form expanded microparticles.

The composition then flows through the a zone or zones of relatively high permeability in the subterranean formation under increasing temperature conditions, until the composition reaches a location where the temperature or pH is sufficiently high to promote expansion of the microparticles.

Unlike conventional blocking agents such as polymer solutions and polymer gels that cannot penetrate far and deep into the formation, the composition of this invention, due to the size of the particles and low viscosity, can propagate far from the injection point until it encounters the high temperature zone.

Also, the polymeric microparticles of this invention, due to their highly crosslinked nature, do not expand in solutions of different salinity. Consequently, the viscosity of the dispersion is not affected by the salinity of the fluid encountered in the subterranean formation. Accordingly, no special carrier fluid is needed for treatment. Only after the particles encounter conditions sufficient to reduce the crosslinking density, is the fluid rheology changed to achieve the desired effect.

Among other factors, the reduction in crosslinking density is dependent on the rate of cleavage of the labile crosslinker. In particular, different labile crosslinkers, have different rates of bond cleavage at different temperatures. The temperature and mechanism depend on the nature of the crosslinking chemical bonds. For example, when the labile crosslinker is PEG diacrylate, hydrolysis of the ester linkage is the mechanism of de-crosslinking. Different alcohols have slightly different rates of hydrolysis. In general, methacrylate esters will hydrolyze at a slower rate than acrylate esters under similar conditions. With divinyl or diallyl compounds separated by an azo group such as the diallylamide of 2,2'-Azobis(isbutyric acid), the mechanism of de-crosslinking is elimination of a nitrogen molecule. As demonstrated by various azo initiators for free radical polymerization, different azo compounds indeed have different half-life temperatures for decomposition.

In addition to the rate of de-crosslinking, we believe that the rate of particle diameter expansion also depends on the total amount of remaining crosslinking. We have observed that the particle expands gradually initially as the amount of crosslinking decreases. After the total amount of crosslinking passes below a certain critical density, the viscosity increases explosively. Thus, by proper selection of the labile cross-linker, both temperature- and time-dependent expansion properties can be incorporated into the polymer particles.

The particle size of the polymer particles before expansion is selected based on the calculated pore size of the highest permeability thief zone. The crosslinker type and concentration, and hence the time delay before the injected particles begin to expand, is based on the temperature both near the injection well and deeper into the formation, the expected rate of movement of injected particles through the thief zone and the ease with which water can crossflow out of the thief zone into the adjacent, lower permeability, hydrocarbon containing zones. A polymer microparticle composition designed to incorporate the above considerations results in a better water block after particle expansion, and in a more optimum position in the formation.

In a preferred aspect of this embodiment, the composition is added to injection water as part of a secondary or tertiary process for the recovery of hydrocarbon from the subterranean formation.

In another preferred aspect of this embodiment, the injection water is added to the subterranean formation at a temperature lower than the temperature of the subterranean formation.

The composition is added in an amount of from about 100 to 10,000 ppm, preferably from about 500 to about 1500 ppm and more preferably from about 500 to about 1000 ppm based on polymer actives.

In another preferred aspect of this embodiment, the diameter of the expanded polymeric microparticles is greater than one tenth of the controlling pore throat radius of the rock pores in the subterranean formation.

In another preferred aspect of this embodiment, the diameter of the expanded polymeric microparticles is greater than one fourth of the controlling pore throat radius of the rock pores in the subterranean formation.

In another preferred aspect of this embodiment, the subterranean formation is a sandstone or carbonate hydrocarbon reservoir.

In another preferred aspect of this embodiment, the composition is used in a carbon dioxide and water tertiary recovery project.

In another preferred aspect of this embodiment, the composition is used in a tertiary oil recovery process, one component of which constitutes water injection.

In another embodiment, this invention is directed to a method of increasing the mobilization or recovery rate of hydrocarbon fluids in a subterranean formation comprising injecting into the subterranean formation a composition comprising polymeric microparticles according to claim 1 wherein the microparticles have a smaller diameter than the pores of the subterranean formation and wherein the labile cross linkers break under the conditions of temperature and pH in the subterranean formation to decrease the mobility of the composition.

In another aspect of this embodiment, the composition is added to injection water as part of a secondary or tertiary process for the recovery of hydrocarbon from the subterranean formation.

In another aspect of this embodiment, the injection water is added to a producing well. Use of the composition of this invention in a producing well increases the oil-to-water ratio of the produced fluid. By injecting a composition comprising the polymeric microparticles of this invention and allowing the particles to expand, the water producing zones can be selectively blocked off.

In another aspect of this embodiment, the injection water is added to the subterranean formation at a temperature lower than the temperature of the subterranean formation.

In another aspect of this embodiment, the subterranean formation is a sandstone or carbonate hydrocarbon reservoir.

The foregoing may be better understood by reference to the following examples, which are presented for purposes of illustration and are not intended to limit the scope of this invention.

EXAMPLES 1–8

Preparation of the Polymeric Microparticle

The polymeric microparticle of this invention is readily prepared using inverse emulsion polymerization techniques as described below.

A representative emulsion polymer composition is prepared by polymerizing a monomer emulsion consisting of an aqueous mixture of 164.9 g of 50% acrylamide, 375.1 g of 58% sodium acrylamido methylpropane sulfonate (AMPS), 16.38 g water, 0.5 g 40% pentasodium diethylenetriaminepentaacetate, 3.2 g of 1% solution of methylenebisacrylamide (mba), and 36.24 g polyethyleneglycol(PEG) diacrylate as the dispersed phase and a mixture of 336 g petroleum distillate, 60 g ethoxylated sorbitol oleate and 4 g sorbitan sesquioleate as the continuous phase.

The monomer emulsion is prepared by mixing the aqueous phase and the oil phase, followed by homogenization using a Silverson Homogenizer. After deoxygenation with nitrogen for 30 minutes, polymerization is initiated by using sodium bisulfite/sodium bromate redox pair at room temperature. The temperature of the polymerization is not regulated. In general, the heat of polymerization will take the temperature from about 25° C. to about 80° C. in less than 5 minutes. After the temperature peaks, the reaction mixture is heated at about 75° C. for an additional 2 hours.

If desired, the polymeric microparticle can be isolated from the latex by precipitating, filtering, and washing with a mixture of acetone and isopropanol. After drying, the oil and surfactant free particle can be redispersed in aqueous media. The average particle size of this latex particle measured in deionized water, using a Malvern Instruments' Mastersizer E, is 0.28 micron.

Table 1 lists representative emulsion polymers prepared according to the method of Example 1.

TABLE 1

Preparation of polymeric microparticles in emulsion form

| | Ex. 1 | Ex. 2 | Ex. 3 | Ex. 4 | Ex. 5 | Ex. 6 | Ex. 7 | Ex. 8 |
|---|---|---|---|---|---|---|---|---|
| 50% acrylamide | 164.9 | 164.9 | 82.45 | 131.84 | 82.5 | 82.5 | 82.5 | 82.5 |
| 58% Na AMPS | 375.1 | 375.1 | 187.55 | 300 | 187.5 | 187.5 | 187.5 | 187.5 |
| DI water | 19.58 | 19.58 | 12.5 | 36.8 | 18 | 22.9 | 25.3 | 26.5 |
| Methylene bisacrylamide | 0.032 | 0.032 | 0 | 7.36 | 0 | 0 | 0 | 0 |
| PEG-200 diacrylate | 36.24 | 18.12 | 30.46*[1] | 0 | 9.75 | 4.87 | 2.44 | 1.22 |

TABLE 1-continued

Preparation of polymeric microparticles in emulsion form

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Crosslinker/monomer molar ratio (ppm) | 56890 | 28500 | 28390 | 28390 | 18390 | 9080 | 4540 | 2270 |
| Petroleum distillate | 336 | 336 | 168 | 268.8 | 168 | 168 | 168 | 168 |
| Ethoxylated sorbitol oleate | 60 | 60 | 30 | 48 | 30 | 30 | 30 | 30 |
| Sorbitan sesquioleate | 4 | 4 | 2 | 3.2 | 2 | 2 | 2 | 2 |

*[1]PEG-400 diacrylate

EXAMPLE 9

Expandable vs. Non-expandable Particles

The viscosity (cP) of a 1% dispersion of the polymers of Examples 5–8 in deionized water and in a 720 ppm NaCl solution are listed in Table 2. The 1% dispersion is prepared by inverting the polymer emulsion in aqueous medium with the aid of inverting surfactant. The viscosity is measured at room temperature with a Brookfield LV viscometer at 60 rpm.

TABLE 2

Viscosity (cP) of a 1% polymer dispersion at room temperature

|  | Viscosity (cps) | | | |
|---|---|---|---|---|
|  | Ex. 5 | Ex. 6 | Ex. 7 | Ex. 8 |
| Deionized water | 5.5 | 54 | 1360 | 8300 |
| 720 ppm NaCl | 3.8 | 6.2 | 26 | 138 |
| Ratio of DI vs. 720 ppm NaCl | 1.45 | 8.7 | 52.3 | 60 |
| Crosslinker/monomer molar ratio (ppm) | 18000 | 9080 | 4540 | 2270 |

The data show that with increasing level of incorporated crosslinker, the ability of the crosslinked particle to swell decreases. When crosslinking density exceeds a certain level, the particle shows a very low tendency to swell, even in deionized water. The viscosity ratio in deionized water vs. saline water provides a good indication of the ability of the particle to expand. The data also show that even a very low level of electrolyte can reduce the ability of the particle to expand. Particles of Example 5 show properties of non-expandable particles.

EXAMPLE 10

To illustrate the non-swelling nature of the polymeric microparticles of this invention, the viscosity of the aqueous dispersions of latex particles in Examples 1 and 2 in water of different salinity are shown in Table 3. The viscosity is measured using a Brookfield LV viscometer with an UL adaptor at 60 rpm. at 75° F.

TABLE 3

Viscosity of Polymer Dispersions in Aqueous Saline Solution

|  |  | Viscosity in different media (cps) | | | |
|---|---|---|---|---|---|
| Concentration | Sample | DI | Synthetic field brine 0.45% TDS | 2% KCl | Ratio of DI vs. 2% KCl |
| 1.5% dispersion | Example 1 | 1.45 | 1.45 | 1.6 | 0.9 |
| 1.5% dispersion | Example 2 | 3.55 | 1.75 | 2.1 | 1.7 |
| 1% dispersion | Example 1 | 1.3 | 1.3 | 1.4 | 0.9 |
| 1% dispersion | Example 2 | 2 | 1.35 | 1.35 | 1.5 |
| 0.5% dispersion | Example 1 | 1.1 | 1.05 | 0.95 | 1.2 |
| 0.5% dispersion | Example 2 | 1.45 | 1.1 | 1.1 | 1.3 |
|  | Blank | 1 | 0.95 | 1.05 | 0.95 |

The small viscosity ratio of deionized water vs. 2% KCl shows that the particles of Examples 1 and 2 are non-expandable even when the salinity contrast is expanded to 20,000 ppm.

EXAMPLE 11

Activation of the Polymeric Microparticle Using Heat

Activation of the polymeric microparticles of this invention by heat is illustrated in this Example.

Table 4 shows the viscosity (cP) of a 0.5% aqueous dispersions of the latex particle after the dispersion has been aged at 140° F., 175° F. and 210° F. in the synthetic brine (4570 ppm TDS) described in Table 6. The viscosity is measured at 75° F. using Brookfield LV No.1 spindle at 60 rpm (shear rate 13.2 sec$^{-1}$).

TABLE 4

Viscosity (cP)

| Days aged | 140° F. | | | 175° F. | | | 210° F. | | | |
|---|---|---|---|---|---|---|---|---|---|---|
|  | Ex. 1 | Ex. 2 | Ex. 3 | Ex. 1 | Ex. 2 | Ex. 3 | Ex. 1 | Ex. 2 | Ex. 3 | Ex. 4 |
| 0 | 3.3 | 3.1 | 3.3 | 3.3 | 3.1 | 3.3 | 3.3 | 3.1 | 3.3 | 2.3 |
| 2 | — | — | — | — | — | — | 5 | 9 | 12 | — |
| 5 | — | — | — | 4.1 | 6 | 12 | 5 | 13 | 36 | — |
| 10 | 3.5 | 4.2 | 5 | 4.2 | 8.9 | 21.4 | 7 | 33 | 64 | 2.3 |
| 15 | — | — | — | — | — | — | 14 | 46 | 44 | — |
| 20 | 3.2 | 5.6 | — | 4.8 | 20.4 | 41 | 27 | 49 | — | 2.8 |
| 25 | — | — | 6.5 | — | — | 50 | — | — | 50 | — |
| 30 | 3.6 | 5.4 | — | 5.7 | 40.4 | — | 36 | 55 | — | 3.2 |
| 40 | 4.1 | 6.8 | — | 7.2 | 37.8 | — | — | 48 | — | 3.1 |
| 45 |  |  |  |  |  |  | 57 | — | — | — |

The data show, for the particle of Example I, no swelling is observed after 30 days at 140° F. and 175° F. The particle is activated (begins swelling) after it had been heated at 210° F. for more than 10 days. For the particle of Example 2, no swelling is observed after 30 days at 140° F. and swelling begins after it is exposed to 175° F. for at least 10 days or to 210° F. for at least 2 days. For the particle of example 3, activation took place after 5 days at 175° F. or 2 days in 210° F. No activation of the particle of Example 4 is observed after 40 days at 210° F. The data show that only the articles crosslinked with reversible crosslinker are capable of expanding after triggering using heat. Particles crosslinked with non-reversible crosslinker (Example 4) cannot expand.

EXAMPLE 12

This Example demonstrates that the polymeric microparticle can be propagated with a conformation constrained by the built-in reversible crosslinks and will expand in size when these break, to give a particle of suitable size to produce a substantial effect.

A 40 foot long sand pack of 0.25 inches internal diameter, made from degreased and cleaned 316 stainless steel tubing, is constructed in eight sections. The sand used to fill the tubes is a fraction of commercial sand (Cementitious reference material—F sand) obtained from David Ball PLC, Huntingdon Road, Bar Hill, Cambridge CB3 8HN, UK. The particle size distribution of the sand is measured using test sieves and is shown in Table 5 below. Before use, the sand is washed in concentrated hydrochloric acid to remove iron and other impurities, then rinsed until the washings are of constant pH. Finally it is dried in air, in an oven at 140° F. (60° C.).

TABLE 5

F - Sand Test Sieve Particle Size Analysis.

| Bottom Size in fraction ($\mu$m) | Weight oversize (g) | % Oversize | Cum % Oversize |
|---|---|---|---|
| 150 | 12.14 | 6.12 | 6.12 |
| 125 | 75.91 | 38.23 | 44.35 |
| 90 | 85.67 | 43.14 | 87.49 |
| 63 | 17.04 | 8.58 | 96.07 |
| 45 | 2.28 | 1.15 | 97.22 |
| 0 | 0.71 | 0.36 | 97.58 |

Each of the five-foot sections is joined to the next by a sand filled Swagelok™ connector. Every two sections there are T fittings to enable pressure transducers to be attached. Each contains a circle of 325 mesh US sieve (45 micrometer aperture) on the transducer arm, to retain the sand packed into the tubes. At the inlet and outlet, the tubes are fitted with ⅜" to ¼" reducing couplings, once again containing retaining meshes.

The full length of tube is carefully coiled into a circle of approximately 17 inches diameter and loaded into a Gallenkamp™ Model "Plus II" Laboratory oven. Fluids from a 34 fluid ounce (1 liter) borosilicate glass reservoir are pumped to the tube inlet by a Gilson 307 positive displacement piston pump. Druck™ PDCR pressure transducers are attached to the T—pieces of the tube and connected through Druck™ DPI 260 series Digital Pressure indicators, a Datascan™ 7010 Measurement Processor and an RS 232 Bus to a Labview™ virtual instrument package which records the data from the experiment.

A Tescom™ 250 back pressure valve is attached to the outlet side of the tube and connected onwards to a Pharmacia™ LKB-Frac-200 fraction collector.

When the system is fully assembled the sand pack is flushed with Carbon dioxide gas at an inlet pressure of approximately 26 psi for a minimum of two hours after which the system is flooded with synthetic oil field injection water having the composition shown in Table 6.

TABLE 6

Composition of the Test Brine

| Ion | Test Brine Composition mg/l |
|---|---|
| Na | 1497.2 |
| K | 40 |
| Mg | 6.1 |
| Ca | 11.6 |
| Cl | 1350.9 |
| SO4 | 46 |
| HC03 | 1645.9 |
| TDS | 4571 |

The injection rate is maintained at 1 ml/min for 367 minutes then decreased to 0.1 ml/min for a further 100 minutes. The pore volume (PV) of the pack is determined to be 142.2 ml from the weight and average grain density of the sand used, and the overall permeability is measured as 2.57 Darcys at 0.1 mls/min. The permeabilities of the sections are;

| 0 to 20 feet | 2.46 D |
|---|---|
| 20 to 30 feet | 2.46 D |
| 30 to 40 feet | 2.95 D |

A 1500 ppm active dispersion of the polymeric microparticle of Example 3 is prepared in the test brine detailed above. To 489.9 g of test brine at 145° F. (63° C.) 7.5 grams of an ethoxylate sulfate surfactant is added by difference, then stirred for 30 seconds using a Turbine Ultra—Turrax mixer set to low speed. The mixer speed is increased to high then 2.56 grams of the polymer emulsion is weighed by difference and injected into the vortex of the brine. The mixture is sheared at high speed for 10 seconds then the rate is reduced to low for a further 30 minutes. No attempt is made to maintain the temperature of the solution at the original level. The "solution" is subsequently sonicated using a Decon Ultrasonics Limited, FS400 Ultrasonic bath for 5 minutes then stored in a screw capped Borosilicate bottle for use. Two solution preparations are used in the current test and these are mixed together before starting.

The solution is sparged to remove dissolved oxygen, for at least 30 minutes prior to pumping, by passing a mixture of 99% Nitrogen with 1% Carbon dioxide (BOC PLC, UK) into it through a glass frit bubbler at a slow rate of approximately 2 ml per minute. The gas mixture is used in order to avoid pH changes associated with dissolved Carbon Dioxide removal on bubbling with Nitrogen alone. Sparging of the solution is continued throughout the experiment to ensure that the solution is oxygen free and avoid the possibility of free radical degradation of the polymer.

Starting at 0.288 days elapsed time, polymer "solution" is injected into the pack at 0.1 ml/min for 1432 minutes (1.0 PV) to fill the pore volume, then the flow rate is reduced to 0.01 ml/min. The fraction collection is started at 1.27 elapsed days. The polymer is injected for a further 263.5 hours at 0.01 ml/min (equivalent to 1.1 Pore volumes of the sand) and the pressure drops across the tube sections are monitored for signs of conformation change of the polymer particle as the reversible cross-links hydrolysed. The "popping open" of the polymer particles is observed as a steep rise in the pressure drop across the last 10 feet of the tube, starting at 7.15 cumulative days elapsed, equivalent to 6.87 days residence time at 212° F., and peaking at an RF of about 300. The longest time an element of polymer could have remained in the pack before exit is 9.875 days (the residence time of the pack at 0.01 ml/min).

At 12.26 days elapsed time, after the conformational change is observed and sufficient time has passed for a trend to be established, the flow rate in the pack is increased to 0.035 ml/min for 47.3 hours (0.7 PV), to determine the effect of increased rate/pressure drop on the block formed in the end tube. The resistance factor at 0.035 ml/min is about one third of that at 0.01 ml/min, as shown in Table 7 below. The feed solution is changed back to brine at 0.035 ml/min to determine the residual resistance factor (RRF) of the polymer and 1.77 PV (251.4 ml) of brine is injected giving an RRF of 60 to 90. After this the flow rate is increased to 0.05 ml/minute for a further 64.8 hours (1.37 PV) when the observed RRF is 75 to 100.

The data show that the particles are able to travel through the first two sections of the sand pack without changing the RRF of the sections. However, particles in the last section, after accumulating a sufficient amount of residence time, have expanded and give a higher value of RRF. The higher RRF value is maintained after the injection fluid is changed from polymer dispersion to brine.

This experiment clearly demonstrates two critical aspects of the invention which are:

1. The polymeric microparticle with a conformation constrained by the built-in reversible crosslinks can be propagated through a porous media.
2. It will expand in size when crosslinks break, to give a particle of suitable size to produce a substantial effect, even in a high permeability porous medium.

EXAMPLE 13

Effect of pH

Latex samples in Example 13 and 14 are prepared according to the method Example 1 using the recipe listed in Table 8.

TABLE 7

Summary of the Sand Pack Experiment

| Elapsed time (Days) | Flowing | Pore volumes Injected | 7.34/s Outlet solution viscosity (cP) | Flow rate (mls/min) | RF/RRF 0–20 feet | 20–30 feet | 30–40 feet |
|---|---|---|---|---|---|---|---|
| 1 | Polymer | 3.096 | | Various | Brine flush and initial polymer fill | | |
| 2 | Polymer | 3.454 | | 0.01 | 6.1 | 4.4 | 3.1 |
| 3 | Polymer | 3.555 | | 0.01 | 6.3 | 4.3 | 4.2 |
| 4 | Polymer | 3.6565 | 45.62 | 0.01 | 6.3 | 4.6 | 4.7 |
| 5 | Polymer | 3.7577 | 38.85 | 0.01 | 6.2 | 4.7 | 5.4 |
| 6 | Polymer | 3.8589 | 42.63 | 0.01 | 6.7 | 5.4 | 5.8 |
| 7 | Polymer | 3.9602 | 38.74 | 0.01 | 6.1 | 5.6 | 4.8 |
| 7.5 | Polymer | 4.0109 | 55.1 | 0.01 | 6.5 | 5.4 | 20.9 |
| 8 | Polymer | 4.0816 | 44.8 | 0.01 | 6.7 | 5.6 | 39.9 |
| 9 | Polymer | 4.1627 | 41.12 | 0.01 | 5.3 | 5.4 | 84.6 |
| 10 | Polymer | 4.2639 | 42.79 | 0.01 | 5.9 | 5.4 | 159.4 |
| 11 | Polymer | 4.3653 | 31.24 | 0.01 | 6.3 | 5.2 | 230.1 |
| 12 | Polymer | 4.4766 | 58.5 | 0.01 | 6.6 | 5.2 | 297.4 |
| 12.2 | Polymer | 4.4868 | | 0.01 | 7.0 | 5.3 | 297.9 |
| 12.3 | Polymer | 4.509 | | 0.035 | 2.8 | 2.7 | 104.4 |
| 12.4 | Polymer | 4.5435 | | 0.035 | 2.1 | 2.7 | 102.8 |
| 12.6 | Polymer | 4.6145 | | 0.035 | 2.6 | 2.4 | 91.5 |
| 12.8 | Polymer | 4.686 | | 0.035 | 2.4 | 2.3 | 79.1 |
| 13 | Polymer | 4.756 | 74.51 | 0.035 | 2.6 | 2.2 | 69.4 |
| 13.2 | Polymer | 4.826 | | 0.035 | 2.3 | 2.2 | 59.3 |
| 13.4 | Polymer | 4.8982 | | 0.035 | 2.1 | 2.2 | 53.4 |
| 13.6 | Polymer | 4.97 | | 0.035 | 2.6 | 2.1 | 49.8 |
| 13.5 | Polymer | 5.039 | | 0.035 | 2.3 | 2.1 | 49.8 |
| 14 | Polymer | 5.1115 | 64.87 | 0.035 | 2.4 | 2.1 | 49.4 |
| 14.4 | Brine | 5.2526 | | 0.035 | 2.2 | 2.0 | 49.0 |
| 15 | Brine | 5.465 | | 0.035 | 2.2 | 2.1 | 51.3 |
| 16 | Brine | 5.8195 | | 0.035 | 2.0 | 2.0 | 58.8 |
| 17 | Brine | 6.174 | 58.90 | 0.035 | 2.0 | 1.8 | 60.2 |
| 18 | Brine | 6.528 | 71.7 | 0.035 | 2.0 | 1.8 | 71.2 |
| 19 | Brine | 6.882 | 80.61 | 0.035 | 1.9 | 1.9 | 89.7 |
| 19.1 | Brine | 6.919 | | 0.035 | 1.9 | 1.9 | 91.1 |
| 19.3 | Brine | 7.003 | | 0.05 | 1.6 | 1.6 | 88.8 |
| 20 | Brine | 7.356 | 42.0 | 0.05 | 1.6 | 1.6 | 99.1 |
| 21 | Brine | 7.862 | 22.66 | 0.05 | 1.7 | 1.7 | 91.3 |
| 21.9 | Brine | 8.268 | | 0.05 | 1.7 | 1.6 | 75.8 |

TABLE 8

|  | Ex. 13 | Ex. 14 |
|---|---|---|
| 50% acrylamide | 164.9 | 164.9 |
| 58% Na AMPS | 375.1 | 375.1 |
| DI water | 43.90 | 37.40 |
| PEG-200 diacrylate | 11.96 | 18.12 |
| Crosslinker/monomer molar ratio (ppm) | 18740 | 28390 |
| Petroleum distillate | 336 | 336 |
| Ethoxylated sorbitol oleate | 60 | 60 |
| Sorbitan sesquioleate | 4 | 4 |

The expansion profiles of the polymeric microparticles of Example 13 and 14, expressed in viscosity change of a 0.5% dispersion, aged in aqueous media of different pH are shown in Table 9. The composition of the brines are shown in Table 10. The viscosity is measured with a Brookfield LV viscometer with No. 1 spindle at 60 rpm. at 74° F.

The viscosity data show that at neutral pH range (6.2–7.5), the particles show only small degree of expansion (as shown by small amount of viscosity increase). Under similar conditions, in the slightly alkaline (pH 8.5–9.0) medium, the viscosity increase is much faster. This demonstrates that the particle can expand in response to alkaline pH (pH>8). Since the reversible crosslinkers used in these particles are diester in nature, these particles can also expand in response to slightly acidic conditions (pH<6).

TABLE 9

Viscosity (cP) change of a 0.5% polymer particle dispersion after aging

| Hours of aging | Ex. 13 @ 175° F. pH 6.2–7.5 | Ex. 13 @ 175° F. pH 8.5–9.0 | Ex. 14 @ 175° F. pH 6.2–7.5 | Ex. 14 @ 175° F. pH 8.5–9.0 | Ex. 14 @ 210° F. pH 6.2–7.5 | Ex. 14 @ 210° F. pH 8.5–9.0 |
|---|---|---|---|---|---|---|
| 0 | 3.1 | 3.1 | 3.1 | 3.3 | 3.2 | 3.3 |
| 24 |  | 8.8 |  | 5.9 |  | 8.5 |
| 48 |  | 13.9 |  | 6.9 |  | 12.1 |
| 120 | 6.6 | 19.3 | 6.1 | 12.0 | 5.0 | 36.5 |
| 240 |  | 24.0 |  | 21.4 |  | 64.1 |
| 360 |  | 37.9 |  | 51.3 | 7.2 | 43.8 |
| 480 | 7.5 | 33.5 | 5.4 | 41.0 |  | 32.7 |
| 600 | 7.2 | 34.8 | 5.7 | 49.8 | 8.3 | 49.8 |

TABLE 10

Composition of the Test Brine for Example 13

| Ion | Brine 1 PH 6.2–7.5 Mg/l | Brine 2 PH 8.5–9.0 mg/l |
|---|---|---|
| Na | 1497.2 | 1497.2 |
| K | 40 | 40 |
| Mg | 6.1 | 6.1 |
| Ca | 11.6 | 11.6 |
| Cl | 2308.7 | 1350.9 |
| SO4 | 46 | 46 |
| HC03 | — | 1645.9 |
| TDS | 3901 | 4571 |

EXAMPLE 14

Effect of Labile Crosslinker Concentration on Polymer Microparticle Volume

Using viscosity measurement as an approximation of particle volume, the viscosity of aqueous suspensions of a series of crosslinked particles incorporating various amount of crosslinker is measured. The polymer particles are made by the procedure of Examples 1–8 using PEG 400 diacrylate as the only crosslinker. As shown in Table 11, particle size increases initially slowly, then explosively as the labile crosslinker concentration decreases.

TABLE 11

Viscosity of a 1% dispersion of polymer particle in 718 ppm saline water

| Crosslinker (ppm) | 28390 | 18170 | 9088 | 4544 | 2272 |
|---|---|---|---|---|---|
| Viscosity (cP) | 3.4 | 3.8 | 6.2 | 26 | 137 |

What is claimed is:

1. A method of preparing highly cross linked expandable polymeric microparticles having an unexpanded volume average particle size diameter of from about 0.05 to about 10 microns comprising polymerizing one or more allylic, vinylic or acrylic monomers under free-radical forming conditions in the presence of about 9,000 to about 200,000 ppm of labile cross linkers and 0 to about 300 ppm of non-labile cross linkers.

2. The method of claim 1 wherein the polymeric microparticle has an unexpanded volume average particle size diameter of from about 0.1 to about 3 microns.

3. The method of claim 1 wherein the polymeric microparticle has an unexpanded volume average particle size diameter of from about 0.1 to about 1 microns.

4. The method of claim 1 wherein the monomers are acrylic monomers.

5. The method of claim 4 wherein the acrylic monomers are selected from the group consisting of nonionic, cationic, anionic, betaine and ampholytic ion pairs.

6. The method of claim 5 wherein the nonionic monomers are selected from acryloyl morpholine acrylamide, N-methylacrylamide, N,N-dimethylacrylamide and methacrylamide.

7. The method of claim 5 wherein the cationic monomers are selected from methacrylamidopropyl trimethyl ammonium chloride, acrylamidopropyl trimethyl ammonium chloride dimethylaminoethylacrylate methyl chloride quaternary salt, dimethylaminoethylmethacrylate methyl chloride quaternary salt and diallyldimethyl ammonium chloride.

8. The method of claim 5 wherein the anionic monomers are selected from 2-acrylamido-2-methyl propanesulfonic acid sodium salt, vinyl sulfonic acid sodium salt and styrene sulfonic acid sodium salt.

9. The method of claim 5 wherein the ampholytic ion pair monomers are selected from acid-base salts of a basic, nitrogen-containing monomer selected from dimethylaminoethylacrylate (DMAEA), dimethylaminoethyl methacrylate (DMAEM) and 2-methacryloyloxyethyldiethylamine and an acidic monomer selected from acrylic acid, 2-acrylamido-2-methylpropane sulfonic acid, 2-methacryloyloxyethane sulfonic acid, vinyl sulfonic acid and styrene sulfonic acid.

10. The method of claim 5 wherein the betaine monomer is N,N-dimethyl-N-methacryloyloxyethyl-N-(3-sulfopropyl)-ammonium betaine.

11. The method of claim 1 wherein the labile cross linker is selected from diacrylates and polyfunctional vinyl derivatives of a polyalcohol.

12. The method of claim 11 wherein the labile cross linker is polyethyleneglycol diacrylate.

13. The method of claim 1 wherein the non-labile cross linker is selected from methylene bisacrylamide, diallylamine, triallylamine, divinyl sulfone, diethyleneglycol diallyl ether.

14. The method of claim 13 wherein the non-labile cross linker is methylene bisacrylamide.

15. The method of claim 1 wherein the cross linked expandable polymeric microparticle is an amphoteric microparticle comprising one or more anionic monomers and one or more cationic monomers.

16. The method of claim 15 wherein the amphoteric polymeric microparticle has a higher than 1:1 anionic monomer/cationic monomer mole ratio.

17. The method of claim 16 wherein the amphoteric polymeric microparticle comprises one or more nonionic monomers, one or more anionic monomers and one or more cationic monomers.

18. The method of claim 1 wherein the cross linked expandable polymeric microparticle is a betaine-containing polymeric microparticle.

19. The method of claim 1 wherein the cross linked expandable polymeric microparticle is an ion pair-containing polymeric microparticle.

* * * * *